Patented May 19, 1953

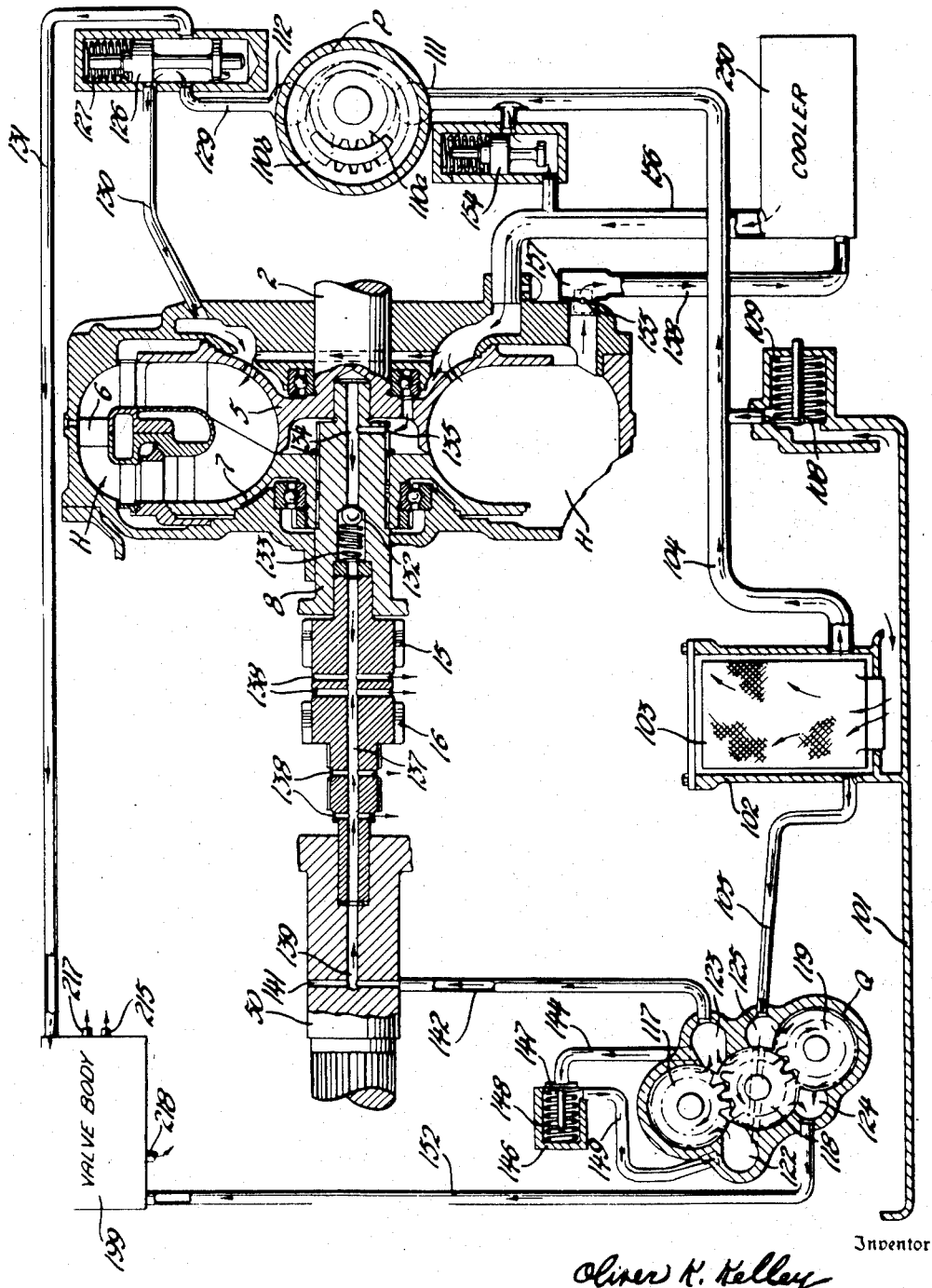

2,638,746

UNITED STATES PATENT OFFICE 2,638,746

FLUID CONTROL FOR ROTARY TURBINE TYPE HYDRAULIC TORQUE CONVERTERS

Oliver K. Kelley, Birmingham, Mich., assignor to General Motors Corporation, Detroit, Mich., a corporation of Delaware Original application September 14, 1946, Serial No. 697,092. Divided and this application November 30, 1949, Serial No. 137,836

4 Claims. (Cl. 60—54)

The present application is a divisional of my application for U. S. Letters Patent S. N. 697,092 filed September 14, 1946, for "Continuous Torque Drive."

The present invention relates to hydraulic torque converters and more particularly to fluid control for rotary turbine type hydraulic torque converters.

The invention is adaptable for use in heavy vehicle transmissions as well as in connection with hydraulic torque converters used in tractors, oil well drills, mine machinery, pumps, etc., and equally well in passenger vehicles having such torque converter transmission.

An object of the invention is to provide a fluid system for hydraulic rotary turbine type torque converters wherein the working fluid is properly circulated through the torque converter and wherein the fluid is maintained at a proper operating temperature.

A further object of the present invention is to provide a fluid system for a hydraulic torque converter wherein oil oxidation and slushing are minimized.

Further objects of my invention will appear in the detailed description following, in connection with the accompanying drawing and from the appended claims.

The figure is a diagram of the torque converter fluid flow and supply system shown in a more complete hydraulic system for a power transmission. The fluid system may be used with other types of hydraulic torque converters than shown and in other types of power transmissions.

As shown in the figure, shaft 2 is the torque converter input shaft and is driven by a prime mover such as an internal combustion engine. The left end of input shaft 2 extends into the work space of a torque converter housing and is integrally formed with a bladed impeller rotor 5. Reaction blades 6 and a bladed turbine rotor 7 are positioned within said work space, the reaction blades being fixed to the inner wall of the housing and the turbine rotor being fixed to a driven shaft 8 which drives output shaft 50 by way of a gear transmission represented by pinion gears 15 and 16. The torque converter is of a known variety and its operation is described in Letters Patent U. S. # 1,199,359 to Föttinger issued September 26, 1916.

A sump 101 is provided to maintain a supply of oil to be pumped through a filter 102 having a screen 103. The oil is supplied to either pump unit Q or unit P. The pump provides fluid under pressure for lubrication of the transmission and to the valve body 199 which controls flow of fluid under pressure to various elements that operate the hydraulically controlled change speed gear unit not shown, this gear unit being driven from gears 15 and 16. Other gear units may be provided in front of the torque converter unit or behind it depending on the variety of ratios and maximum torque ratio desired. The gear unit may be an overspeed mechanism or an ordinary torque increasing mechanism.

Pump unit Q consists of pump gears 117, 118 and 119 mounted on three shafts; the gears adapted to cooperate to pump liquid from supply or suction chambers 122 and 125 to pressure chambers 123 and 124. The gear shafts are driven from the gear unit not shown connected with gears 15 and 16. Pump pressure chamber 123 connects with passage 142 that further connects with side passages 141 formed in output shaft 50. These side passages connect to circular passage 139 formed in shaft 50 that leads to circular passage 137 and side lubrication passage 138 of the gear unit. This lubrication passage 137 is further supplied through check valve 132 that will be described in more detail below. Pump pressure passage 123 in addition to connecting with lubrication passage 142 also connects with regulating valve 147 by way of passage 144 leading to cylinder 146. The valve 147 is held against pump pressure by spring 148 and when the pump pressure is in excess of approximately 15 lbs., the valve opens allowing the pressure to relieve through passage 149 to suction chamber 122 of the pump Q. Pump pressure chamber 124 opens to passage 152 leading to the valve body 199 that supplies fluid under pressure for control and operation of the change speed gear unit. This gear unit and its control forms no part of the present invention. The valve body 199 has passages 215, 217 and 218 leading to control units of the gearing not shown. This valve body and its control of the change speed gearing is fully described in my application 697,092 cited above.

Pump P has a suction inlet port 111 opening to pump suction passage 104 leading into filter 102. This passage 104 connects also with a passage leading to a control valve 108 connected to the sump 101, the valve being held by spring 109 that allows the valve to open at a suction of about 5 lbs. above that of the sump compartment. This provides an additional input supply to pump P that is proportional with increase of engine speeds. The pressure value of this valve may be predetermined for desired operating response by selection of valve area and spring force.

Pump P consists of a pump gear 110a keyed to input shaft 2, and hence, is driven directly by the prime mover, and a gear idler 110b, the gear and idler members cooperating to produce suction and pressure in a well known manner.

Pump P provides fluid under pressure through outlet port 112 opening to pump discharge passage 129. This passage feeds to an unbalanced regulator control valve 126 that operates against an adjustable spring 127. This valve has two lands of unequal area so that fluid pressure entering between the lands from the pump acts to move the valve up against the spring. Whenever the pump pressure exceeds 100 lbs., valve 126 is raised to allow fluid under pressure to enter pressure line 130 leading to the inner radial working space of the torque converter. A second outlet port between the valve lands is connected to pressure passage 131 that leads to control valve body 199. This last passage provides an additional supply of oil to the valve body for use in the control of the gear unit.

A dynamic flow of liquid through the torque converter is maintained by providing a check valve 132 loaded by a spring 133 in the shaft 8. The shaft 8 has a central passage 134 leading to the check valve and is connected to the torque converter working space by means of side passages 135. Check valve 132 opens to allow fluid to pass into central passage 137, such fluid draining back to the supply sump through the lubrication passages described above.

The temperature of the oil in the torque converter is controlled by providing a circulation of the liquid through a cooler unit 250. High pressure liquid in the outer radial zone of the turbine working space is allowed to pass to the cooler by a thermostatic valve 155 located in passage 157 leading to pressure line 158 and thence to the cooler unit 250 as shown in the figure.

The thermostatic valve 155 which may be of common commercial type, is adjustable to open at temperatures of approximately 250° F. so that the cooler can maintain the whole circulating oil body at temperatures below the decomposition point of the oil. The outlet passage 156 from the cooler is connected in two ways, first, to the inner low pressure zone of the converter working space, and second, to the regulator valve 154 having an outlet lead to suction line 104 of the front pump P. This regulator valve 154 is adjustable to open at approximately 75 lbs. of pressure.

By this arrangement of by-passing, the foaming of the hot oil that would otherwise be entirely circulated through the converter is avoided, and the bearings of the transmission are adequately lubricated by a cool oil. The thermostatic valve can be adjusted to maintain different working temperatures of the torque converter depending on the type of drive work and operating conditions present.

The fluid control system described above, in connection with an application of the invention to a construction example, provides for controlling the flow, pressure, and temperature in the torque converter and the advantages of such control will be apparent to one skilled in the art as will the application of the invention to other arrangements than the particular one disclosed in the example.

What I now claim and desire to secure by U. S. Letters Patent is:

1. In combination with a torque converter having a bladed working space, a pump, a pump pressure discharge passage, a pressure control valve in said pump discharge passage responsive to pressure in said passage, a pressure supply passage connecting said control valve to the inner radial zone of said converter working space, said control valve being effective in one position to block said pressure supply passage from said pump discharge passage and effective in a second position to establish communication between said passages, an oil cooler, a passage connecting the outer radial zone of said converter working space to said oil cooler, valve means responsive to the temperature of fluid in said working space for controlling the discharge of fluid from said working space, said valve being effective in one position to block the flow of fluid from said working space to said last-mentioned passage and effective in another position to connect said converter working chamber and said cooler in series, an oil return passage connecting said oil cooler to the inner radial zone of said converter working space, and valve means responsive to pressure in said return passage for limiting the pressure of fluid returned to said working space from said cooler.

2. In combination with a torque converter having a bladed working space, a pump, a pump discharge passage, a control valve connected to said pump discharge passage responsive to pressure in said passage, a pressure supply passage connecting said control valve to the inner radial zone of said bladed working space, said control valve being effective in one position to block off said pressure supply passage from said pump discharge passage and effective in a second position to establish communication between said passages, an oil cooler, a passage leading from the outer radial zone of said bladed working space to said oil cooler, a passage leading from said oil cooler to the inner radial zone of said working space, a pump suction passage, a branch passage connecting said oil cooler discharge passage and said pump suction passage, and a pressure regulating valve in said branch passage for regulating the pressure of oil supplied to the inner radial zone of said bladed working space.

3. In combination with a torque converter having a bladed working space, a pump, suction and discharge passages for said pump, a pressure control valve in said pump discharge passage responsive to pressure in said passage, a pressure supply passage connecting said control valve to the inner radial zone of said bladed working space, said control valve being effective in one position to block said pressure supply passage from said pump discharge passage and effective in another position to establish communication between said passages, an oil cooler, a passage connecting the outer radial zone of said bladed working space to said oil cooler, valve means responsive to temperature of oil in said bladed working space for controlling the discharge of fluid to said last-mentioned passage, a return passage connecting the inner radial zone of said bladed working space and said oil cooler, a branch passage connecting said return passage and said pump suction passage, and a valve responsive to pressure in said branch passage effective in one position to block off said branch passage from said pump suction passage and effective in another position to establish oil flow communication between said return passage and said pump suction passage.

4. In combination with a torque converter having a bladed working space, a pump, a pump discharge passage, a pressure control valve in said pump discharge passage responsive to pressure in said passage, a pressure supply passage connecting said control valve to the inner radial zone of said working space, said control valve being effective in one position to block off said pressure supply passage from said pump discharge passage and effective in a second position to establish communication between said passages, a fluid exhausting passage leading from the inner radial zone of said working space, a check valve controlling the discharge of fluid from said fluid exhaust passage, an oil cooler, a passage connecting the outer radial zone of said bladed working space and said oil cooler, a thermostat valve responsive to temperature of oil in said bladed working space for controlling the discharge of fluid to said last-mentioned passage, a return passage connecting the inner radial zone of said bladed working space to said oil cooler, and a pressure regulator valve responsive to pressure in said return passage for limiting the pressure of fluid returned to said working space from said oil cooler.

OLIVER K. KELLEY.

References Cited in the file of this patent

UNITED STATES PATENTS

| Number | Name | Date |
|---|---|---|
| 1,640,608 | Klimek | Aug. 30, 1927 |
| 2,143,312 | Griswold | Jan. 10, 1939 |
| 2,322,577 | Kuhns et al. | June 22, 1943 |
| 2,343,304 | La Brie | Mar. 7, 1944 |
| 2,357,295 | Thompson | Sept. 5, 1944 |
| 2,423,812 | Karl et al. | July 8, 1947 |
| 2,459,734 | McCracken | Jan. 18, 1949 |